Figure 1:
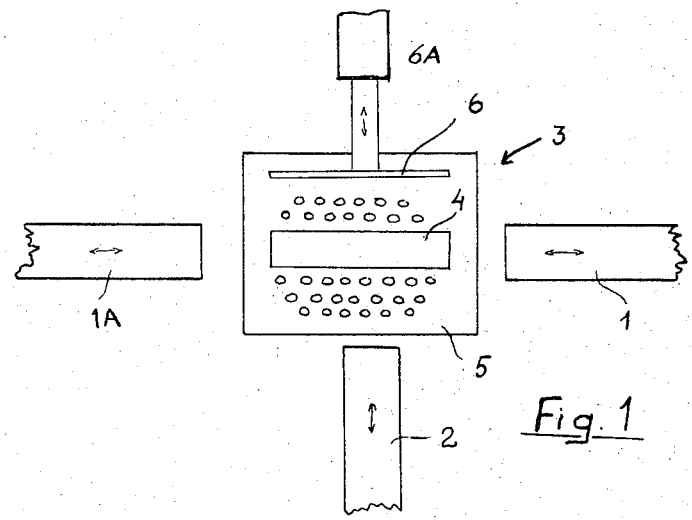

United States Patent [19]
Jepsen

[11] 3,822,777
[45] July 9, 1974

[54] JUNCTION SWITCH FOR CONVEYING SYSTEMS

[75] Inventor: Jens Thomsen Jepsen, Hjerting, Denmark

[73] Assignee: K. J. Maskinfabriken A/S, Hjerting, Denmark

[22] Filed: May 17, 1972

[21] Appl. No.: 254,081

[30] Foreign Application Priority Data
June 2, 1971 Denmark.............................. 2674/71

[52] U.S. Cl............. 198/31 AB, 198/24, 214/1 BE
[51] Int. Cl............................................. B65g 47/26
[58] Field of Search........... 198/24, 31 AB, 96, 126, 198/185; 214/1 BE

[56] References Cited
UNITED STATES PATENTS
3,017,041   1/1962   Hawkes et al. ...................... 198/222
3,469,887   9/1969   Nakahara et al. ................. 214/1 BE
3,624,782   11/1971  McPeek et al. .................... 214/1 BE Primary Examiner—Evon C. Blunk
Assistant Examiner—Joseph E. Valenza
Attorney, Agent, or Firm—Burns, Doane Swecker & Mathis

[57] ABSTRACT

Conveyor system for bundles of papers, such as newspapers and weeklies, having several conveying tracks meeting at a junction which includes an air cushion table. A conveying track on the table that runs in the direction of one output conveying track is vertically adjustable and a transverse conveyor is provided to push the air cushion-supported bundles transversely of the running direction of the track on the table when this last-mentioned track is lowered. Hence the bundles can be pushed onto a second output conveying track without damage to the lower sheets in the bundle.

3 Claims, 3 Drawing Figures

Luft

JUNCTION SWITCH FOR CONVEYING SYSTEMS

The present invention relates to a junction switch for a conveying system, particularly for bundles of newspapersand and weeklies with a first conveying track extending through the junction and a second conveying track branching off from or ending in the junction.

In the junction between two adjoining conveying tracks it is known to use a switch with a combination of driven roller-tracks and chain-or belttracks, which may be lifted up and lowered.

When using such a switch for bundles of newspapersand weeklies this system gives rise to certain drawbacks. Thus the driven rollers act on the soft bottom and papers of the bundle and paper flaps may be jammed, whereby the bottom paper or the bottom weekly are torn. Besides the bundle is exposed to a strong mechanical stress in case of change of direction.

An object of the invention is to provide a junction switch without the said drawbacks.

This is according to the invention achieved in the manner that the switch comprises a first feed mechanism working between and in the direction of travel of a pair of spaced coneyor belts of the first conveying track and which has a supporting surface which can be lifted up and lowered in relation to an air cushion table, and a second feed mechanism working in the direction of travel of the other conveying track across the air cushion table.

The first feed mechanism may according to the invention advantageously consist of a conveyor band.

When a bundle of newspapers has to pass the junction of the first and second conveying tracks, the first feed mechanism is lifted up, and its supporting surface leads the bundle through the junction without any risk of damage.

If a bundle of newspapers has to be led from the first conveying track into the other, the supporting surface of the first feed mechanism is lifted up and consequently active until the bundle is just above the air cushion table, and the supporting surface is lowered so that the bundle now rests on the air cushion. Then the bundle is pushed by the other feed mechanism into the other conveying track without any risk of damage.

When a bundle has to be led from the second conveying track into the first one, the supporting surface is lowered until the bundle is just above the air cushion table. On account of the speed of the bundle on the second track no further feed mechanisms are necessary for the short conveyance across the air cushion table causing only an insignificant friction. When the bundle is carried by the air cushion the supporting surface is lifted up and leads the bundle into the first conveying track. Thus there is not either in this case any risk of damaging the bundle.

Figure 2:
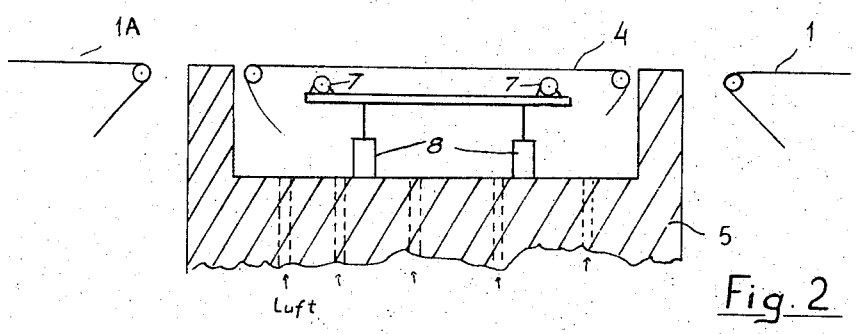

The invention will now be explained in further details below with reference to the drawing, in which FIG. 1 shows part of a conveying system with a junction switch according to the invention in top view, FIG. 2 a section through the switch in side elevation, and FIG. 3 same with a feed mechanism in an other position.

FIG. 1 shows part of a conveying system with a first conveying track comprising first and second conveyor belts 1 and 1A; with a junction, in which the conveying track adjoins a second conveying track including a thread conveyor belt 2. In the junction there is a switch 3 for e.g., bundles of newspapers-or weeklies, which are conveyed on or between the two tracks.

The junction switch comprises a first feed mechanism, which in the shown embodiment is made of a fourth endless conveyor belt band, or 4 which is carried over suitable rolls or rollers 4A. The fourth conveyor belt 4 has a supporting surface, which can be moved in the travel direction of the first conveying track 1, 1A and the supporting surface can be lifted up or lowered in relation to an air cushion table 5, the surface of which is lying essentially on the same level as the conveying surfaces of the two tracks 1, 1A, and 2, respectively. Such lifting and lowering may be accomplished by means of a pair of rollers 7 which are raisable into engagement with the fourth conveyor belt 4 by a pair of fluid cylinders 8.

At the free edge of the table 5 i.e., opposite to the third conveying belt 2, is embedded a feed mechanism which is movable across the table in the direction of travel of the third track 2, which feed mechanism consists of a conveyor plate 6 which is attached to the end of e.g., a piston rod 6A.

The switch shown works in the following manner.

Figure 3:
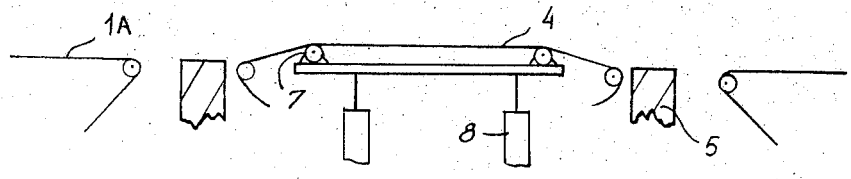

When a bundle has to pass the junction between spaced ends of the first and second conveying belts 1 and 1A, the supporting surface of the conveyor band 4 is lifted up as shown in FIG. 3 by raising the roller 7. The conveyor band, therefore, leads the bundle from one belt of the conveying track 1 to the other belt 1A.

If a bundle has to be led from the first to the second conveying track, the supporting surface of the conveyor band 4 is lifted up and, thereby, active until the bundle is just above the pressure air table. When the bundle is carried by the band 4 and the air cushion, the band is lowered, and the bundle, therefore, remains in its position above the table. By means of the conveyor plate 6 the bundle, which is now carried by the air cushion, is now led into the third conveying belt 2, without the bundle being able to touch the band 4 or in other way to get damaged.

If a bundle has to be conveyed from the second to the first conveying track, the supporting surface of the conveyor band 4 is lowered and the bundle will, when leaving the third conveying belt 2, on account of its speed and the low friction against the supporting surface, due to the air cushion, slide in across the air cushion table 5, until it hits the supporting plate 6, which is standing still. The bundle is now above the conveyor band 4 and when the supporting surface is lifted up, the bundle is led into the first conveying belt 1.

Irrespective of from where and to where a bundle has to pass the junction between the two conveying tracks 1 and 2, the bundle is thus not exposed to mechanical overload, which could damage one or more papers in the bundle.

In the embodiment shown in the drawing the first conveying track and the switch are physically separated. Within the scope of the invention the conveyor band 4 may naturally be a part of the first conveying track.

What is claimed is:

1. Junction switch apparatus in combination with a conveying system transporting bundles of papers, particularly newspapers and weeklies, the conveying system including first, second, and third power driven conveying means; said first and second power driven conveying means being aligned and oriented to transport bundles in a first direction of travel; said third power driven conveying means extending in a second direction angled relative to the first direction; said junction switch being located between spaced opposite ends of said first and second power driven conveying means and adjacent an end of said third power driven conveying means and comprising:
- a fourth power driven conveyor means aligned with said first and second power driven conveying means for moving a bundle linearly between said first and second conveyor means;
- air cushion table means disposed adjacent said fourth power driven conveying means and including means for directing pressurized air upwardly for supporting a bundle above said fourth power driven conveying means;
- means for:
    raising at least a portion of said fourth power driven conveying means relative to said air cushion table means for engaging and supporting a bundle delivered from said first power driven conveying means and transporting this bundle to said second power driven conveying means, and lowering said portion relative to said air cushion table means such that pressurized air supports a bundle above said fourth power driven conveying means; and
- transverse power driven conveying means for engaging and shifting an air cushion-supported bundle across said air cushion table means and onto said third power driven conveying means.

2. A junction switch according to claim 1 wherein said fourth conveying means is a conveyor belt.

3. A junction switch according to claim 2 wherein only the upper portion of said fourth conveying means is raisable.

* * * * *